Figure 1:
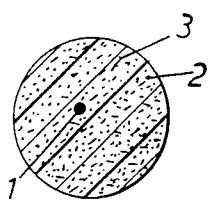

United States Patent
Margolis et al.

[11] 3,887,265
[45] June 3, 1975

[54] OPTICAL GUIDES

[75] Inventors: David Saul Margolis, London; John Edward Taylor, Cookham, both of England

[73] Assignee: British Insulated Callender's Cables Limited, London, England

[22] Filed: Nov. 8, 1973

[21] Appl. No.: 413,826

[30] Foreign Application Priority Data
Nov. 10, 1972 United Kingdom............... 52097/72

[52] U.S. Cl. .................................... 350/96 B; 65/4
[51] Int. Cl. .............................................. G02b 5/16
[58] Field of Search ......................... 350/96 B; 65/4

[56] References Cited
UNITED STATES PATENTS

| | | | |
|---|---|---|---|
| 3,272,063 | 9/1966 | Singer .................... | 350/96 B |
| 3,505,046 | 4/1970 | Phaneuf .................. | 350/96 B |
| 3,544,192 | 12/1970 | Goldstein ................ | 350/96 B |
| T900,002 | 7/1972 | Wielar.................... | 350/96 B |

*N.* Lawrence
*Assistant Examiner*—C. L. Church
*Attorney, Agent, or Firm*—Buell, Blenko & Ziesenheim

[57] ABSTRACT

An optical cable comprises at least one optical bundle, at least one separate elongate non-optical reinforcing member, and, surrounding the bundle or bundles and the reinforcing member or members, an outer protective sheath. The or each optical bundle of the cable includes a plurality of elongate optical elements each consisting of at least one optical fibre, the optical elements being at least partially embedded in and mutually separated by encapsulating material throughout the length of the bundle which substantially reduces relative movement between the embedded optical elements. The optical elements may be embedded in the encapsulating material in a predetermined configuration, the encapsulating material being of such a nature that the position of each optical element with respect to the positions of the other optical elements is maintained substantially constant to provide for ready identification of an optical element at any transverse cross-section of the cable.

20 Claims, 6 Drawing Figures

OPTICAL GUIDES

This invention relates to optical guides for the transmission of the ultra-violet, visible and infra-red regions of the electromagnetic spectrum, which regions, for convenience, will hereinafter be included in the generic term "light," and especially, but not exclusively, to optical waveguides for use in the communications field adapted for transmission of light having a wave-length within the range 0.8 to 1.1 micrometres.

For the purpose of transmitting light in an optical transmission system it has been proposed to employ optical guides including one or more than one optical fibre. Where the optical guide comprises a plurality of optical fibres these are generally arranged in a bundle which is sometimes enclosed in an outer protective sheath.

The invention is especially, but not exclusively, concerned with optical guides including at least one bundle of optical fibres each of composite form comprising a core of transparent material clad throughout its length with another transparent material of lower refractive index which by total internal reflection of light being transmitted along the fibre confines at least a major proportion of the light within the core. A composite optical fibre is generally, but not necessarily, made of two glasses of different refractive indices, the glass forming the core having a higher refractive index than the glass forming the cladding. In an alternative form of composite optical fibre the core may be made of a transparent liquid having a higher refractive index than that of the cladding.

According to the present invention we provide an improved optical cable comprising at least one optical bundle including a plurality of elongate optical elements each consisting of at least one optical fibre, the optical elements being at least partially embedded in and mutually separated by encapsulating material throughout substantially the whole length of the optical bundle which at least substantially reduces relative movement between the embedded optical elements; at least one separate elongate non-optical reinforcing member; and, surrounding the bundle or bundles and the reinforcing member or members, an outer protective sheath, the reinforcing member of members being of such a material and of such a cross-sectional area having regard to the material or materials and cross-sectional area of the bundle or bundles that the reinforcing member or members at least substantially reduce the strain that would otherwise be imparted to the or each bundle when the cable is stressed in such a way as to tend to subjet the or any optical fibre of the bundle to a tensile force.

Since each fibre and/or each group of fibres of the or each bundle of the optical cable is wholly surrounded by encapsulating material, the surfaces of the fibres and/or groups of fibres are protected by the encapsulating material from mechanical damage that might otherwise be caused by contact or rubbing between adjacent fibres or by abrasion that might otherwise be caused during handling or use.

The encapsulating material of the or each bundle may comprise any encapsulating material that will maintain the positions of the embedded fibres and/or groups of fibres substantially constant with respect to one another. Preferred encapsulating materials include synthetic resins, for instance polyester resin.

Preferred non-optical reinforcing fibres that may be assembled with one or more than one optical fibre to form a bundle or a group of a bundle include carbon fibres and non-optical glass fibres.

By a "non-optical glass fibre" is meant a glass fibre that is unsuitable for use in an optical cable as an optical guide for the transmission of light.

In one method of preparing an optical bundle for use in the optical cable of the present invention several optical fibres and a plurality of rovings each comprising a multiplicity of non-optical glass fibres are passed collectively in the direction of their lengths through a guide system and through at least one applicator by means of which encapsulating material in a liquid or semi-liquid state is applied to the assembly of fibres and the encapsulated assembly of fibres is then passed to a drying/curing oven. Where, as is preferred, the optical fibres are to be wholly surrounded and mutually separated by non-optical fibres, at least some of the rovings travelling towards the applicator are passed through apertures in a lay plate reciprocating in such a way that these rovings are lapped helically around the other fibres of the assembly with a lay that alternates in direction at intervals along the length of the bundle.

The fibres and/or groups of the fibres of the or each bundle of the optical cable may be embedded or partially embedded in and mutually separated by encapsulating material in a predetermined configuration and the encapsulating material be of such a nature that the position of each optical fibre, or of each group including at least one optical fibre, with respect to the positions of the other optical fibres and/or groups including at least one optical fibre is maintained substantially constant to provide for ready identification of an optical fibre or group containing an optical fibre at any transverse cross-section along the length of the bundle.

By way of example the fibres and/or groups of fibres of an optical bundle may be arranged in one or more than one row or in any other suitable array in which any fibre and/or group of fibres can be readily identified by its position with respect to the positions of the other fibres and/or groups of fibres of the bundle.

Removal of encapsulating material from an encapsulated optical bundle as hereinbefore defined over at least a part of its length may be effected by any one of several methods, the particular method employed being dependent on the material or materials of the optical fibres and the encapsulating material used. For instance, where the optical fibres are of lead glass and the encapsulating material is an acrylic resin, a suitable solvent may be employed, e.g. n-methyl 2 pyrrolidone. On the other hand, where the optical fibres are of lead glass and the encapsulating material is a polyester resin, it is preferred to immerse the optical bundle, or part of the optical bundle, for several minutes in hot, concentrated sulphuric acid and, after removing it from the acid, to wash it with water before it is dried. For optical fibres of material or materials having a higher melting point than lead glass, for instance silica glass, the encapsulating material can be removed from a part of the length of a bundle by introducing said part of the bundle into the bore of a closely-fitting tube, subjecting the tube to controlled heating to raise the temperature of the part of the bundle surrounded by the tube to such an extent that the encapsulating material in said part is burnt away, and removing the tube. Preferably the tube is heated by causing an electric current to flow along an electric heating element extending over at least a part of the length of the tube. The heating element preferably comprises a high resistance conductor helically lapped around the tube. Alternatively the tube may be heated in a controlled manner by means of a gas flame or by any other suitable means.

The or each optical bundle of the cable may be enclosed in an outer protective covering, for instance of plastics material. Where the optical cable comprises two or more optical bundles, to facilitate identification of the bundles, each bundle may be enclosed in an outer protective covering of a colour distinguishable from that of the covering of the or each other bundle and/or the encapsulating material of each bundle may be of a colour distinguishable from that of the encapsulating material of the or each other bundle.

The cable may also include at least two electrical conductors which may also serve as tensile reinforcing members.

The outer protective sheath of the cable is preferably an extruded sheath of plastics material. Preferably the sheath is made of a hard polyolefin such as polypropylene or a modified polypropylene, for example propylene ethylene co-polymer. Other suitable materials for the sheath include polyethylene, especially high density polyethylene, and polyvinyl chloride. The sheath may have an oversheath of a material having a low friction co-efficient, such as nylon.

Preferably the or each elongate non-optical reinforcing member is of a material which has a Young's Modulus of at least that of glass, i.e. of at least $6.9 \times 10^4$ MN/m². The or each elongate non-optical reinforcing member may be a single solid element but with a view to making the optical cable as flexible as possible each reinforcing member preferably comprises a plurality of elements stranded together. The or each element is preferably of steel, or other suitable material having the necessary Young's Modulus, or an encapsulated bundle of carbon fibres or of fibres of other suitable material, e.g. non-optical glass fibres. Where the or each reinforcing member is of stranded form, for instance a strand of steel wires, the strand is preferably die-formed; that is to say a strand that has been passed through a die which effects a reduction in the overall diameter of the strand. Such a compacted strand has the advantage over noncompacted strand of a higher apparent Young's Modulus at low strain.

Where the cable includes a plurality of optical bundles these may be arranged in one or more stranded layers around a central elongate non-optical reinforcing member, in accordance with our British application No. 52096/72. Each stranded layer may include at least two elongate electrical conductors.

The invention will be further illustrated by a description, by way of example, of alternative forms of optical bundle and of an optical cable with reference to the accompanying drawings which show cross-sectional end views of the optical bundles and optical cable, each drawn on an enlarged scale.

The optical bundle shown in FIG. 1 has an overall diameter of 1 mm and comprises a single optical fibre 1 of 80 $\mu$m diameter and a plurality of rovings of non-optical glass fibres 2, each non-optical fibre being of 8 $\mu$m diameter, the optical fibre and rovings of non-optical glass fibres being so assembled together that the optical fibre is surrounded by non-optical fibres. Throughout the whole length of the bundle the optical fibre 1 and rovings of non-optical glass fibres 2 are wholly embedded in and mutually separated by polyester resin 3 which prevents or at least substantially reduces relative movement between the embedded optical fibre and embedded rovings.

Figure 2:
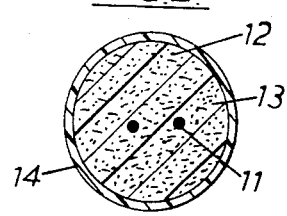

The optical bundle shown in FIG. 2 differs from that shown in FIG. 1 in that two optical fibres 11 are assembled together with and surrounded by a plurality of rovings of non-optical glass fibres 12, the optical fibre and rovings being embedded in and mutually separated by polyester resin 13 and in that an extruded covering 14 of polypropylene surrounds the encapsulated fibres.

Figure 3:
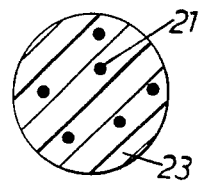

FIG. 3 shows another form of optical bundle in which a random array of six optical fibres 21, each of 80 $\mu$m diameter, are embedded in and mutually separated by polyester resin 23 throughout the whole lengths of the fibres. The optical bundle has a diameter of 1 mm.

Figure 4:
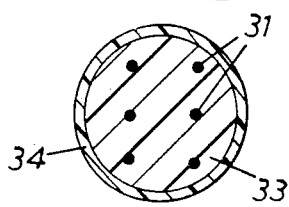
Figure 5:
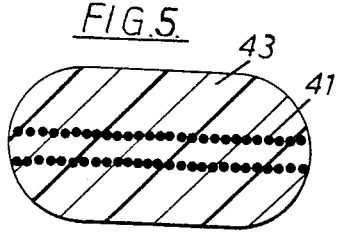

In the optical bundles shown in FIGS. 4 and 5, optical fibres are arranged in a predetermined configuration to provide for ready identification of an optical fibre at any transverse cross-section along the length of the bundle. In the optical bundle shown in FIG. 4 six optical fibres 31 arranged in two rows of three fibres are embedded in and mutually separated by polyester resin 33. An extruded covering 34 of polypropylene surrounds the encapsulated fibres. The optical bundle shown in FIG. 5 comprises 50 composite optical fibres 41, each consisting of a core of low attenuation optical glass and a cladding of glass of lower refractive index than that of the core, arranged in two rows of 25 and encapsulated in a flexible polyester resin 43. The bundle has a width of 2 mm and a thickness of 1 mm.

Figure 6:
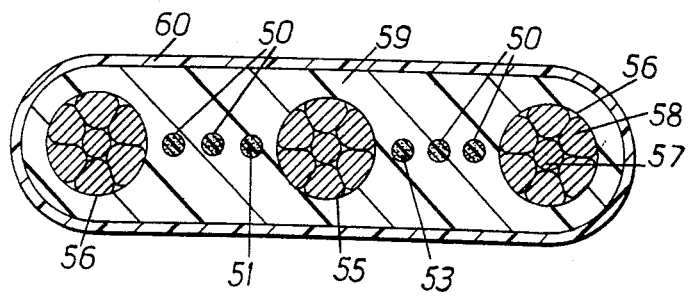

The optical cable shown in FIG. 6 comprises two clusters of optical bundles 50 positioned between three elongate reinforcing members 55 and 56 with the axes of the bundles and reinforcing members lying in a substantially common plane and, surrounding and filling the interstices between the bundles and reinforcing members, an extruded outer protective sheath 59 of propylene ethylene co-polymer. The sheath 59 has an over-sheath 60 of nylon. Each cluster of optical bundles 50 comprises three separate bundles arranged side by side and each comprising 10 composite optical fibres 51 encapsulated in a flexible acrylic resin 53 to form a bundle of substantially circular cross-section having a diameter of 0.5 mm. The resin 53 of each bundle 50 contains a colouring pigment different from that contained in the resin of each of the other bundles. Alternatively, each bundle may be surrounded by an individual covering of a colour different from that of the covering of each of the other bundles. The outer reinforcing members 56 each comprise a stranded body consisting of steel wire core 57 around which are stranded six copper wires 58 and the central reinforcing member 55 comprises a stranded body of seven steel wires. The optical cable has a width of 16 mm and a thickness of 4 mm.

What we claim as our invention is:

1. An optical cable comprising at least one optical bundle including a plurality of elongate optical elements, each consisting of at least one optical fibre, the optical elements being at least partially embedded in and mutually separated by encapsulating material in a predetermined configuration throughout substantially the whole length of the optical bundle, the encapsulating material being of such a nature that relative movement between the embedded optical elements is at least substantially reduced and that the position of each optical element, with respect to the positions of the other optical elements is maintained substantially constant to provide for ready identification of an optical element at any transverse cross-section along the length of the bundle, at least one separate elongate non-optical reinforcing member; and, surrounding the bundle or bundles and the reinforcing member or members, an outer protective sheath; the reinforcing member or members being of such a material and of such a cross-sectional area having regard to the material or materials and cross-sectional area of the bundle or bundles that the reinforcing member or members at least substantially reduce the strain that would otherwise be imparted to the or each bundle when the cable is stressed such a way as to tend to subject the or any optical fibre of the bundle to a tensile force.

2. An optical cable comprising at least one optical bundle including a plurality of elongate optical elements each consisting of at least one optical fibre, the optical elements being at least partially embedded in and mutually separated by encapsulating material throughout substantially the whole length of the optical bundle which at least substantially reduces relative movement between the embedded optical elements; at least one separate elongate non-optical reinforcing member; and, surrounding the bundle or bundles and the reinforcing member or members, an outer protective sheath, the reinforcing member or members being of such a material and of such a cross-sectional area having regard to the material or materials and cross-sectional area of the bundle or bundles that the reinforcing member or members at least substantially reduce the strain that would otherwise be imparted to the or each bundle when the cable is stressed in such a way as to tend to subject the or any optical fibre of the bundle to a tensile force.

3. An optical cable as claimed in claim 2, wherein the optical bundle, or at least one of the optical bundles, includes at least one non-optical reinforcing fibre.

4. An optical cable as claimed in claim 3, wherein the or each non-optical reinforcing fibre of the optical bundle or of each of said optical bundles is a non-optical glass fibre.

5. An optical cable as claimed in claim 3, wherein the or each non-optical reinforcing fibre of the optical bundle or of each of said optical bundles is a carbon fibre.

6. An optical cable as claimed in claim 2, wherein the optical elements of the optical bundle, or of at least one of the optical bundles, are arranged in at least one row.

7. An optical cable as claimed in claim 3, wherein the encapsulating material of the or each optical bundle is a synthetic resin.

8. An optical cable as claimed in claim 2, wherein the outer protective sheath of the cable is an extruded sheath of plastics material.

9. An optical cable as claimed in claim 2, wherein the outer protective sheath of the cable has an oversheath of a material having a low friction co-efficient.

10. An optical cable as claimed in claim 8, wherein the or each optical bundle is enclosed in an outer protective covering.

11. An optical cable as claimed in claim 10, which comprises at least two optical bundles each enclosed in an outer protective covering, wherein the outer protective covering of each bundle is of a colour distinguishable from that of the covering of the or each other optical bundle.

12. An optical cable as claimed in claim 8, which comprises at least two optical bundles, wherein the encapsulating material of each bundle is of a colour distinguishable from that of the encapsulating material of the or each other optical bundle.

13. An optical cable as claimed in claim 8, which includes at least two electrical conductors.

14. An optical cable as claimed in claim 8, wherein the or each non-optical reinforcing member is of a material which has a Young's Modulus of at least $6.9 \times 10^4$ MN/m$^2$.

15. An optical cable as claimed in claim 8, wherein the or each non-optical reinforcing member is a single solid element.

16. An optical cable as claimed in claim 15, wherein the single element is of steel.

17. An optical cable as claimed in claim 8, wherein the or each non-optical reinforcing member comprises a plurality of elements stranded together.

18. An optical cable as claimed in claim 17, wherein the or each stranded reinforcing member is die-formed.

19. An optical cable as claimed in claim 17, wherein each of the plurality of elements is of steel.

20. An optical cable as claimed in claim 8, wherein the or each non-optical reinforcing member comprises an encapsulated bundle of non-optical fibres.

* * * * *